US011139856B2

(12) United States Patent
Brandin et al.

(10) Patent No.: US 11,139,856 B2
(45) Date of Patent: Oct. 5, 2021

(54) METHOD AND SYSTEM FOR TRANSMITTING DATA SETS

(71) Applicant: PARAGON ID, Mougins (FR)

(72) Inventors: Guillaume Brandin, Roquefort les Pins (FR); Claude Gire, Le Bar sur Loup (FR); Eric Gerbault, Vence (FR)

(73) Assignee: PARAGON ID, Mougins (FR)

( * ) Notice: Subject to any disclaimer, the term of this patent is extended or adjusted under 35 U.S.C. 154(b) by 148 days.

(21) Appl. No.: 16/614,661

(22) PCT Filed: May 16, 2018

(86) PCT No.: PCT/EP2018/062675
§ 371 (c)(1),
(2) Date: Apr. 3, 2020

(87) PCT Pub. No.: WO2018/210911
PCT Pub. Date: Nov. 22, 2018

(65) Prior Publication Data
US 2020/0244312 A1    Jul. 30, 2020

(30) Foreign Application Priority Data
May 19, 2017    (FR) ...................................... 1754476

(51) Int. Cl.
*H04B 3/54*        (2006.01)
*H04L 12/10*       (2006.01)

(52) U.S. Cl.
CPC .............. *H04B 3/542* (2013.01); *H04L 12/10* (2013.01)

(58) Field of Classification Search
CPC ................................. H04B 3/542; H04L 12/10
See application file for complete search history.

(56) References Cited

U.S. PATENT DOCUMENTS

| 4,677,646 A | 6/1987 | Dodds et al. |
| 6,459,363 B1 | 10/2002 | Walker et al. |

(Continued)

FOREIGN PATENT DOCUMENTS

| EP | 0366044 A2 | 5/1990 |
| GB | 2348552 A | 10/2000 |

OTHER PUBLICATIONS

International Search Report from corresponding International Application No. PCT/EP2018/062675, dated Jul. 3, 2018, pp. 1-3, European Patent Office, Rijswijk, The Netherlands.

*Primary Examiner* — Vineeta S Panwalkar
(74) *Attorney, Agent, or Firm* — Hauptman Ham, LLP

(57) ABSTRACT

The invention relates to the field of transmitting series of data between electronic circuits, and more specifically a method and a system for transmitting series of data, from a first electronic circuit to at least one second electronic circuit, via an electrical connection line between the first circuit and the second circuit, in reference to a ground line common to the circuits, of at least one series of data pulses. Each data pulse makes it possible to both electrically supply the second circuit and to transmit an item of data which can be interpreted by the second circuit. The supplying of the second circuit by the first circuit is cut between two successive pulses. For each data pulse and before the second circuit is switched off, because of failure in supply, the item of data transmitted by the pulse is stored on a non-volatile memory support of the second circuit.

15 Claims, 2 Drawing Sheets

(56) References Cited

U.S. PATENT DOCUMENTS

| | | | |
|---|---|---|---|
| 7,474,584 B2* | 1/2009 | Yamaoka | G11C 11/417 365/226 |
| 8,719,610 B2* | 5/2014 | Nowak | G06F 1/3203 713/324 |
| 2004/0066669 A1* | 4/2004 | Ooishi | G11C 14/0081 365/173 |

* cited by examiner

METHOD AND SYSTEM FOR TRANSMITTING DATA SETS

RELATED APPLICATION

The present application is a National Phase of International Application Number PCT/EP2018/062675, filed May 16, 2018.

TECHNICAL FIELD OF THE INVENTION

The invention relates to the field of transmitting series of data between electronic circuits.

The invention more specifically relates to a method for transmitting series of data comprising the transmission, from a first electronic circuit to at least one second electronic circuit, via an electrical connection line, making it possible to transmit data of binary type and to electrically supply the second circuit through the first circuit, in reference to a ground line common to the circuits. More specifically, at least one series of so-called data pulses can be transmitted from the first circuit to the second circuit via the electrical connection line, each data pulse making it possible, both to electrically supply the second circuit and to transmit an item of data from a series of data which can be interpreted by the second circuit. The invention also relates to an associated series transmission system.

It has a particularly advantageous application in transmitting data for displaying and electrically supplying a low electrical energy consumption display device, such as an e-paper which furthermore has the advantage of not requiring energy to leave a text or a displayed image.

STATE OF THE ART

There are several methods and systems for transmitting series, according to the generic definition that is given in the preamble above.

Patent document U.S. Pat. No. 6,459,363 B1 discloses a transmission system which falls within this. This system comprises a controller in communication with modules via a two-wire transmission line comprising a supply wire and a ground wire. The system is such that the data can be transmitted from the controller over the transmission line and received at the level of said modules. The signal for supplying modules by the controller is modulated in pulses. The modulation in pulses of the supply signal is such that the modules are continually supplied with electrical energy during one same series transmission, so as to ensure the continuity of the functioning thereof.

Other series transmission systems and methods are known, which are adapted to specific applications, different from the application outlined by the present invention.

An aim of the present invention is therefore to propose a series transmission method and system which are specifically adapted to the application outlined.

SUMMARY OF THE INVENTION

To achieve this aim, according to an embodiment, the present invention provides a method for transmitting series of data comprising the transmission, from a first electronic circuit to at least one second electronic circuit, via an electrical connection line between the first circuit and the second circuit and in reference to a ground line common to the circuits, of at least one series of pulses called data pulses. Each data pulse makes it possible, both to electrically supply the second circuit and to transmit an item of data from a series of data interpretable, that is to say which can be interpreted, by the second circuit.

The method comprises at least the following steps:
cutting the supply of the second circuit by the first circuit between two successive data pulses, and
for each data pulse, and before the second circuit switching off because of failure in supply, storing, on a non-volatile memory support of the second circuit, the item of data transmitted by this data pulse.

The method is thus particularly adapted to the data series transmission from a first circuit to a second circuit, of which the continuous functioning is accessory, even to be avoided.

Optional features, which can possibly be used in association or alternatively, are stated below:
  the cutting of the supply between two successive data pulses can be configured such that the second circuit switches off because of failure in supply. The supply of the second circuit by the first circuit is the only supply provided to supply the second circuit. Thus, a cutting of supply of the second circuit by the first circuit induces the stopping of the second circuit, because of failure in supply. To ensure this, the cutting can be sufficiently long such that the second circuit consumes, dissipates or recovers to the first circuit, the supply energy received, and if necessary partially stored, for example in a condenser, from the instant at which the cutting of the supply has been performed by the first circuit;
  each data pulse can be configured such that the data transmitted depends on a duration of this pulse, the duration of each pulse being, if appropriate measurable by the second circuit with respect to a clock pulse which itself is specific;
  at least one data pulse of each series can be configured to transmit one from among an item of bit data equal to 0 and an item of bit data equal to 1, if appropriate said at least one data pulse having respectively one from among a first duration corresponding to the item of bit data equal to 0 and a second duration corresponding to the item of bit data equal to 1;
  each series of data pulses can comprise a predetermined number of data pulses;
  each series of data pulses can comprise at least one from among an initial data pulse configured to transmit an item of series initialisation data and a final data pulse configured to transmit an item of series end data. One corresponding from among the series initialisation data and the series end data can correspond to a succession of predetermined bits. If appropriate, the initial data pulse has a third duration corresponding to the item of series initialisation data and final data pulse has a fourth duration corresponding to the item of series end data;
  a series of data pulses, even a succession of series, can comprise, preferably periodically, at least one data pulse called control pulse, configured to transmit a control value of a quantity of data intended to be transmitted by the series of data pulses, even by the succession of series. If appropriate, said at least one control data pulse has a fifth duration corresponding to said control value;
  the storage of data transmitted by the data pulses of one same series, even a succession of series, can be configured so as to form a set of bits, even a set of bytes, coding a command which can be interpreted and executed by an integrated circuit of the second circuit.

The method can further comprise the transmission from the first circuit to the second circuit, via the electrical connection line and in reference to the ground line, of a pulse called processing pulse, configured to transmit an order for processing said command.

The method can thus comprise at least the following step: for each processing pulse and before this ends, interpreting and executing the command; if appropriate, the processing pulse has a sixth duration, for example, greater than the duration of each of the data pulses.

Other optional features, which can possibly be used in association or alternatively, are stated below:

the processing pulse can be configured to directly succeed a data pulse, such that these two pulses form one single and same pulse configured to make it possible, before this ends, to store the data transmitted and to interpret and execute the command, without the second circuit switching off, because of failure in supply, interpreting and executing the command can comprise, beforehand, a verification of the validity of the command; if necessary, the verification of the validity of the command is based on the abovementioned control value, interpreting and executing the command can comprise an updating of a display device, such as an e-paper, connected to the integrated circuit of the second circuit; if appropriate, the updating of the display device making it possible to display an item of information defined by the command.

The method can further comprise a repetition of steps to obtain that the interpretation and the execution of the command comprise a new updating of the display device.

The method can further comprise the following step: clearing at least one pulse, even each pulse, transmitted. Each clearing can be configured to succeed directly to a corresponding cutting of supply.

Another aspect of the present invention relates to a data series transmission system comprising a first electronic circuit and at least one second electronic circuit. The first circuit and each second circuit are connected together via an electrical connection line between the first circuit and the second circuit and a ground line common to the circuits. The system is configured to make it possible to transmit, from the first circuit to each second circuit, via the electrical connection line and in reference to the ground line, at least one series of pulses called data pulses. Each data pulse makes it possible to both electrically supply the second circuit and to transmit an item of data from a series of data which can be interpreted by the second circuit. The first circuit comprises a switch of the electrical connection line between the first circuit and the second circuit, the switch being configured to cut the supply between two successive data pulses. The second circuit comprises a non-volatile memory support configured to store the item of data transmitted by each data pulse, before the second circuit is switched off, because of failure in supply. If appropriate, the series transmission system is integrated in a chip card.

BRIEF DESCRIPTION OF THE FIGURES

The aims, objective, as well as the features and advantages of the invention will best emerge from the detailed description of an embodiment of the latter, which is illustrated by the following supporting drawings, wherein.

The drawings are given as examples and are not limiting of the invention. They constitute principle schematic representations intended to facilitate the understanding of the invention and are not necessarily to the scale of practical applications. For example, in FIGS. 3a and 3b, the relative durations of the pulses and possible increases/falls in voltage are not necessarily to scale.

DETAILED DESCRIPTION OF THE INVENTION

By "series transmission", this means a way of transmitting data according to which the information elements succeed one another, over one single communication channel between two electronic circuits.

By "pulse", this means a brief and rapid variation of an electrical signal.

By "clearing", this means an emission of a signal by a receiver to indicate to the transmitter that the message transmitted has been correctly received.

Figure 4:
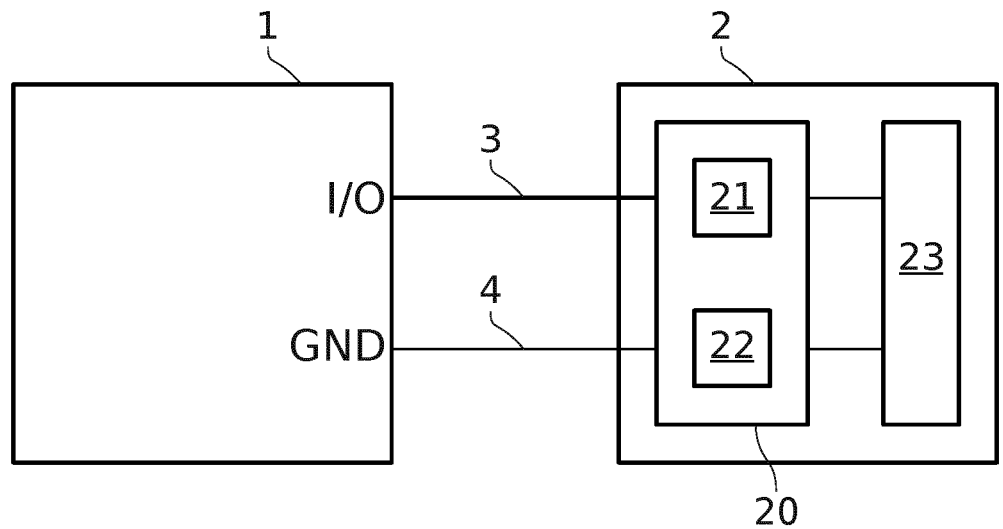
FIG. 4 schematically represents a series transmission system according to an embodiment of the invention.

In reference to FIG. 4, the series transmission system according to an embodiment of the invention comprises a first electronic circuit 1 and at least one second electronic circuit 2. The first and second circuits 1, 2 are connected together by an electrical connection line 3 and by a ground line 4 common to the two circuits 1, 2. If appropriate, the first circuit 1 can comprise a switch (not represented) for supplying the second circuit via the electrical connection line 3. The functioning of the first circuit 1 with the second circuits 2 can in particular use a master-slave technology. The communication between the first circuit 1 and the second circuits 2 can obey an asynchronous protocol, which does not require to use an overall clock signal to synchronise them.

Figure 5:
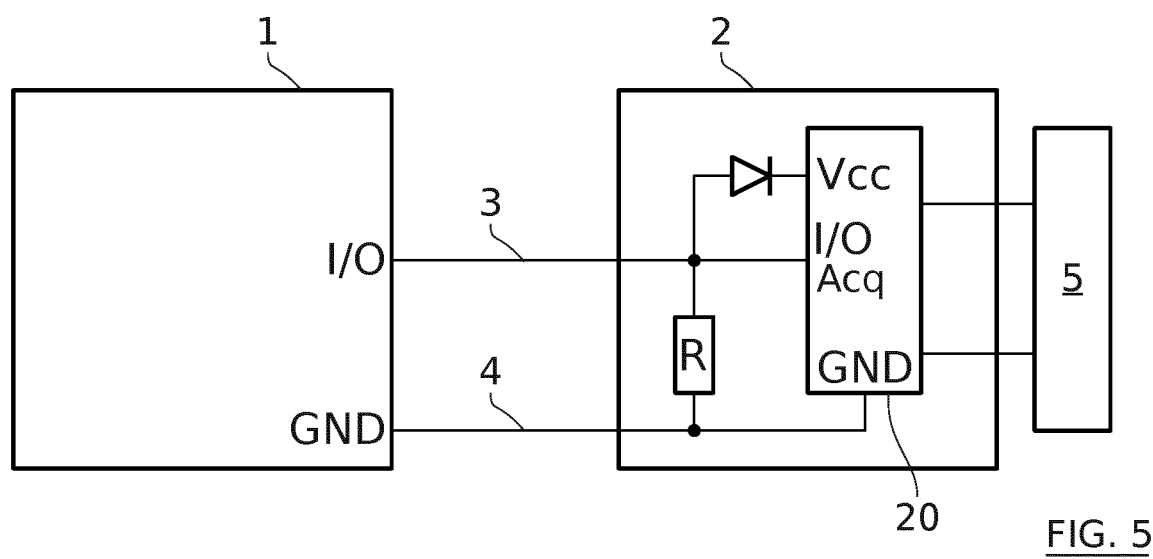
FIG. 5 schematically represents a series transmission system according to another embodiment of the invention.

The second circuit 2 comprises a non-volatile memory support 21 and an integrated circuit 22 or processing means, which can, if appropriate, be comprised in a microprocessor or a microcontroller 20 of the second electronic circuit 2. The non-volatile memory support 21 can in particular be a read-only memory which can be deleted electrically and programmable (also called EEPROM) or a mass memory with rewritable semi-conductors (or flash memory). The integrated circuit integrates a time giving to the second circuit its own clock signal according to which it can discriminate between the pulses of different durations together. The second circuit 2 can also comprise a display device 23 connected to the integrated circuit 22 of the second circuit 2. Alternatively, and as illustrated in FIG. 5, the display device 5 is deported from the second circuit 2, but still connected to the integrated circuit 22 of the second circuit.

According to a preferred embodiment, the display device 5, 23 comprises an e-paper or E-ink screen. The e-paper is a display device 5, 23 which does not require any energy to leave a text or a displayed image. Thus, upon each update of the e-paper, the text or the image that it displays remains visible after the supplying of the second circuit 2 by the first circuit 1 has been cut, and in particular when the second circuit 2 is switched off.

However, the system according to the invention is not at all limited to this particular type of display device 5, 23. In particular, using a display device requiring being continually supplied to display a text or an image can be considered. It can be, for example, an organic light-emitting diode (OLED). Two cases can thus be met.

Firstly, when the supplying of the second circuit 2 by the first circuit 1 is cut, the display device 23 is switched off jointly with the second circuit 2. The displaying of the text or of the image is thus temporary and limited at most at the times at which the first circuit 1 supplies the second circuit 2. The duration of each display, and consequently at least one from among pulses for supplying the second circuit 2 by the first, can thus be adapted to a particular application. For example, the OLED can be supplied by the first circuit 1 via the second circuit 2 to display a text or an image, the supplying of the OLED being maintained for a duration corresponding to the use to which the display is intended. With the current communication means, and in particular smartphones, different applications can be considered. In particular, reading means, such as a camera or a barcode reader, of the text or of the image displayed, such as a QR code or a symbol, can be intended to be implemented to make use of the display.

Secondly, the display device 5 can have its own electrical supply source. The display can be (or not) maintained continuously according to the application outlined, independently of the state of functioning or the stopping of the second electronic circuit 2.

The embodiment of the system such as illustrated in FIG. 5 can be, at any point, according to the embodiment of the system such as described above in reference to FIG. 4. The embodiment of the system such as illustrated in FIG. 5 is however specifically adapted to the implementation of a series transmission method according to an embodiment of the invention, wherein the transmission of a pulse for supplying the second circuit 2 by the first circuit 1 can be cleared in a controlled manner. The detailed description of the embodiment illustrated in FIG. 5 will be referred back to, when the clearing procedure illustrated in FIGS. 3a and 3b will be detailed.

The series transmission method according to an embodiment of the invention will now be described in reference to FIG. 1.

Figure 1:
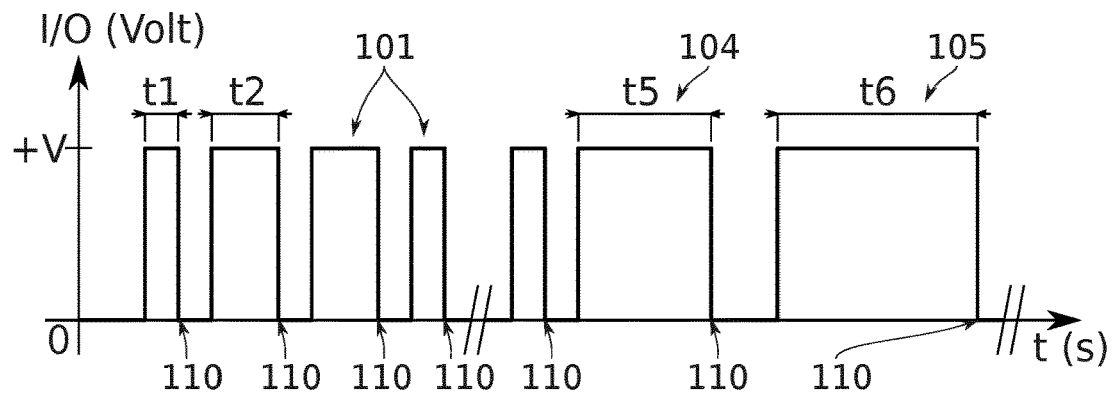
FIG. 1 schematically illustrates an embodiment of the series transmission method according to the invention.

The method for transmitting series of data according to the embodiment illustrated in FIG. 1 comprises the transmission, from the first circuit 1 to at least one from among the second circuits 2, via an electrical connection line 3 between the first circuit 1 and the second circuit 2, and in reference to a ground line 4 (GND) common to the circuits 1, 2, of a series of pulses such as illustrated in FIG. 1. Below, "of" the second circuit 2 will be spoken about, without excluding that it can be about "said at least one" second circuit 2, and therefore several second circuits 2.

The series of pulses comprises, in particular, pulses called data pulses 101. Each data pulse 101 makes it possible both to electrically supply the second circuit 2 and to transmit an item of data which can be interpreted by the second circuit 2. Each data pulse 101 is therefore also a supply pulse.

After a certain time from the origin of the time axis illustrated in FIG. 1, the series of pulses comprises firstly a first data pulse 101. This first data pulse 101 is, for example, configured to transmit an item of bit data equal to 0; more specifically, the first data pulse 101 can be configured to have a first duration t1 corresponding to the item of bit data equal to 0. Once this first pulse duration t1 is reached, the method comprises a first cutting 110 of the supply of the second circuit 2 by the first circuit 1.

The first cutting 110 is show by arrows in FIG. 1 as being carried out at the instant immediately according to the first duration t1. This illustration can therefore make the cutting appear as being instantaneous. However, the first cutting 110 is potentially maintained over time, in particular so as to induce the stopping of the second circuit, because of failure in supply.

It is understood that each cutting 110 can last for an indeterminate time. This time actually has no other limits greater than those required, or compatible, with the application outlined, the latter could be necessarily limited over time.

Preferably, before the first data pulse 101 ends, and in any case, before the first cutting 110 induces the stopping of functioning of the second circuit 2, the item of bit data equal to 0 transmitted via the first data pulse 101 is stored on the non-volatile memory support 21 of the second circuit 2.

After the first cutting 110, the series of pulses such as illustrated comprises a second data pulse 101. This second data pulse 101 is configured to transmit an item of bit data equal to 1. If appropriate, the second data pulse 101 has a second duration t2 corresponding to the item of bit data equal to 1.

A second cutting 110 is carried out, for example, under one of the conditions described above, relative to the first cutting 110.

Preferably, before the second data pulse 101 ends, i.e. before the second cutting 110 is carried out, the item of bit data equal to 1 transmitted via the second data pulse 101 is stored on the non-volatile memory support 21 of the second circuit 2. The storage of the item of bit data equal to 1 transmitted via the second data pulse 101 is carried out in a correlated manner to the storage of the item of bit data equal to 0 transmitted via the first data pulse 101.

The same thus goes for the following data pulses 101, such that is stored, according to the example illustrated in FIG. 1, the series of bits: 0110 . . . 0, on the memory support 21 of the second circuit 2. This storage is carried out such that the series of bits can be read and can be interpreted by the integrated circuit 22 of the second circuit 2. The three small points integrated in this series of bits are linked, due to the fact that all of the series of data pulses 101 is not necessarily illustrated in FIG. 1; some have been able to be omitted from this graphic representation for concise purposes. Indeed, the two marks, diagonal and parallel to one another, passing through the abscissa axis on the graph illustrated in FIG. 1 correspond to the non-illustration of a data pulse 101, of a series of data pulses 101, even a succession of series of data pulses 101, not represented. During this period not represented, data can therefore have been transmitted which are in the series of bits represented above by the three small points.

As illustrated in FIG. 1, the series of pulses illustrated then comprises a data pulse called control pulse 104. This control data pulse 104 is configured to transmit a control value of a quantity of data. Said quantity of data is, for example, that intended to be transmitted by the series of data pulses 101. It can also correspond to the quantity of data transmitted via the abovementioned succession of series. If appropriate, the control data pulse 104 has a fifth duration t5 corresponding to said control value.

This control value is stored on the storage support 21 of the second circuit, preferably before the control data pulse 104 ends. It is intended, for example, to make it possible to control the validity of a command coded in the form of a series of bits, even a series of bytes, transmitted in the manner described above. This type of controlling the validity of an item of information transmitted appears in a protocol known under the name, "cyclic overlapping control" or COC protocol. The method according to this particularity thus makes it possible, at least to ensure that all the expected data has actually been transmitted to the second circuit 2 and stored on the storage support 21 thereof in a suitable manner. The method according to this particularity can also make it possible to verify that the stored command on the storage support 21 of the second circuit can be interpreted and can be executed by the integrate circuit 22 of the second circuit.

According to the embodiment illustrated in FIG. 1, the control data pulse is followed by a cutting of supply 110, then a pulse called processing pulse 105. Like the data pulses 101, this processing pulse 105 is transmitted from the first circuit 1 to the second circuit 2 via the electrical connection line 3 and in reference to the ground line 4. The processing pulse 105 is distinguished from the data pulse 101 in that it does not necessarily carry an item of data intended to be stored on the storage support 21 of the second circuit. The processing pulse 105 is, as its name indicates, intended to give an order of processing the command transmitted beforehand through the interpretation thereof and the execution thereof, possibly preceded by the validation thereof. The processing pulse 105 can be configured to transmit an order of processing said command. Preferably, before this ends, and in any case, before the second circuit 2 switches off, because of failure in supply, the command is interpreted and executed, and possibly validated beforehand, by the integrated circuit 22 of the second circuit. If appropriate, the processing pulse 105 has a sixth duration t6 for example greater, preferably strictly greater, than the duration of each of the data pulses 101.

Each command can comprise a predetermined number of bits, of series of bits, even series of bytes. Correspondingly, each series of data pulses 101, even each succession of series of data pulses 101, comprises a determined number of data pulses 101. In this manner, the pulse succeeding this predetermined number of data pulses 101 can be, on the one hand, configured by the first circuit 1 to make it possible to interpret and execute it, even validate it, from the command transmitted, on the other hand directly (i.e. from the start of the transmission thereof to the second circuit) interpreted by the second circuit 2 as an order of interpretation and execution, even validation, of the command transmitted.

As discussed above, the interpretation and the execution of the command can comprise an updating of the display device 5, 23 connected to the integrated circuit 22 of the second circuit 2.

Another embodiment of the method according to the invention will now be described in reference to FIG. 2.

This other embodiment of the method according to the invention comprises steps, identical to those described above in reference to FIG. 1. In particular, the data pulses 101, the series transmission method thereof, the configuring thereof, the data that it makes it possible to transmit, the cuttings of supply 110 can be such as described above. Consequently, mainly the differences between the two embodiments illustrated are described below.

Figure 2:
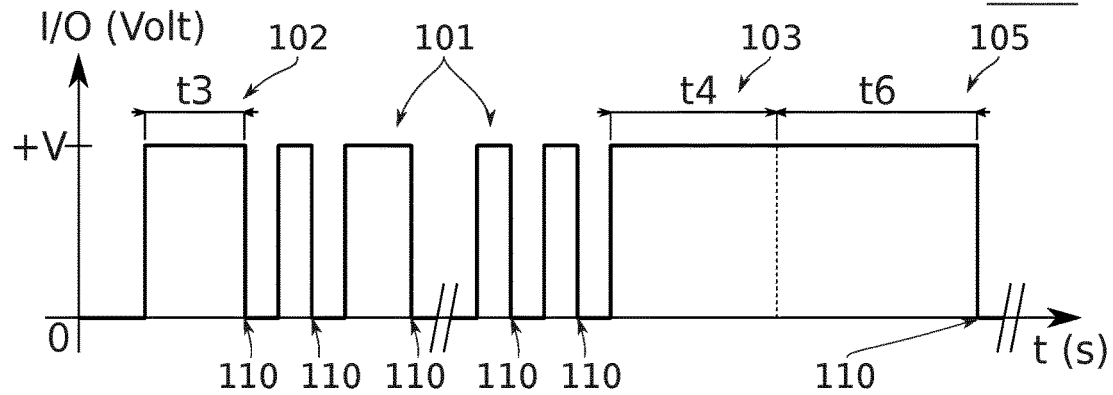
FIG. 2 schematically illustrates another embodiment of the series transmission method according to the invention.

According to the embodiment thereof illustrated in FIG. 2, the series transmission method firstly comprises the transmission of an initial data pulse 102. This initial data pulse 102 is configured to transmit an item of initialisation data of a series of pulses. The method then comprises the transmission of a series of data pulses 101 such as described above. The series transmission method then comprises the transmission of a final data pulse 103. This final data pulse 103 is configured to transmit an item of end data from a series of data pulses 101. The corresponding one from among the item of initialisation data and the end series data can correspond to a predetermined succession of bits, even one or more predetermined bytes. If appropriate, the initial data pulse 102 has a third duration t3 corresponding to the initialisation series data and the final data pulse 103 has a fourth duration t4 corresponding to the item of end series data.

The method thus makes it possible to implement a "start/stop" type protocol. The initial data pulses 102 and final data pulses 103 are detectable and interpretable as such by the integrated circuit 22 of the second circuit. In a manner of speaking, they surround data pulses 101 which define a command, or at the very least, a command portion, which can be interpreted and executed by the integrated circuit 22 of the second circuit 2.

According to the embodiment example illustrated in FIG. 2, the method then comprises a processing pulse 105, still configured to transmit an order of processing the command transmitted beforehand. The processing pulse 105 is configured to directly succeed a data pulse 101, here a final data pulse 103. These two pulses 105 and 101 (or here 105 and 103) form one single and same pulse called data pulse and processing pulse configured to make it possible, preferably before it ends, and in any case before the second circuit switches off, because of failure in supply, to store the data transmitted, and to interpret and execute the command. The processing pulse 105 can therefore only make one with a data pulse 101, for example, with a final data pulse 103, achieving the transmission of the command.

The method according to either of the embodiments described above in reference to FIGS. 1 and 2, or the method according to any other hybrid embodiment, can be repeated to obtain the interpretation and the execution of a new command, resulting in, if appropriate, a new updating of the display device 5, 23. The method thus makes it possible to provide an item of information updated through the display device 5, 23.

Each data pulse 101, 102, 103 and 104 is therefore configured to have a duration greater than the time necessary both to start the second circuit 2 and to store, by the second circuit 2, the item of data transmitted on the non-volatile memory support 21.

The notions of time of starting and stopping the second circuit 2 and the impact thereof on the implementation of the method will now be discussed in reference to FIGS. 3a and 3b.

Figure 3A:
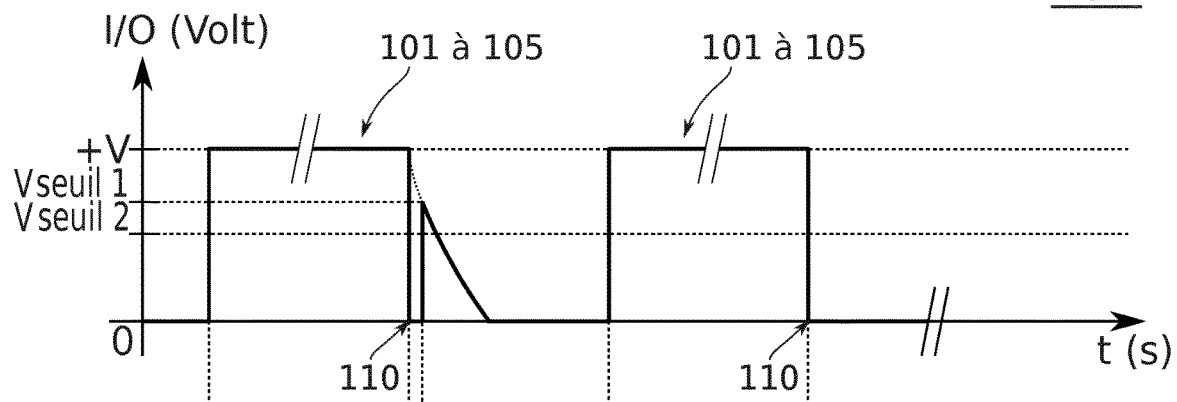
FIGS. 3a and 3b schematically illustrate a pulse, of which the transmission is cleared and a pulse of which the transmission is not cleared.
Figure 3B:
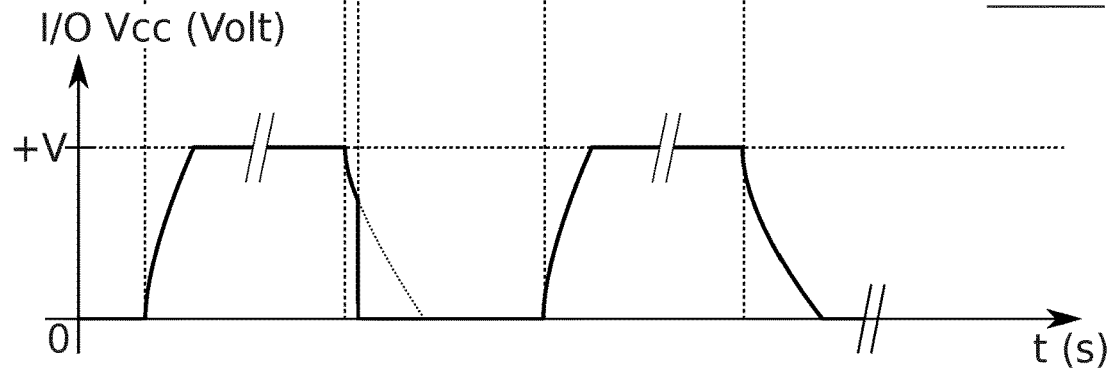

The graphs of FIGS. 3a and 3b can be read, comparatively two-by-two, as representations synchronised together by the correspondence of the abscissas thereof. More specifically, the graph of FIG. 3a represents an electrical signal such as can be measured at the level of the first circuit 1, while the graph of FIG. 3b represents an electrical signal such as can be measured at the level of the second circuit, these two electrical signals having time evolutions linked together in the manner described below. The graph of FIG. 3a represents the evolution over time of the input/output (I/O) voltage of the first circuit 1 and the graph of FIG. 3b represents the evolution over time of the input/output (I/O) voltage of the second circuit 2.

By referring to the first pulse, of value +V, represented on the graph of FIG. 3a, it is simultaneously perceived that at the starting thereof, an electrical signal at the level of the second circuit appears which increased over a given time, typically of around a few microseconds, to reach a threshold value +V of which the transmission makes it possible for the first circuit 1 to electrically supply the second circuit 2. The time for increasing the voltage at the level of the second circuit 2 indicates that the latter does not start instantaneously, but by putting a certain time dependent on the electronic components thereof and of the relative arrangement thereof.

By referring to the last pulse, of value +V, represented on the graph of FIG. 3a, it is simultaneously perceived that at the end thereof, an electrical signal at the level of the second circuit decreases over a given time, typically of around a few microseconds, to reach, from the threshold value +V, a zero value for which the second circuit 2 is switched off, because of failure in supply. The time for decreasing the voltage at the level of the second circuit 2 indicates that the latter is not switched off instantaneously, but by putting a certain time dependent there again on the electronic components thereof and the relative arrangement thereof.

It is considered that the time for increasing and decreasing the voltage at the level of the second circuit is integrated in the implementation of the method according to the invention.

A manner to advantageously integrate these times for increasing and decreasing the voltage at the level of the second circuit consists of making it possible for a clearing by the second circuit 2 to the first circuit 1 of the correct receiving of a pulse. A clearing procedure according to an embodiment of the invention will now be described in reference to FIGS. 3a, 3b and 5.

By referring to the first pulse, of value +V, represented on the graph of FIG. 3a, the cutting of supply 110 corresponds to a putting at a logic level 0 of an output of the first circuit 1. Each clearing thus comprises a tilting at the input of the output of the first circuit 1. The second circuit 2 detects the putting at the logic level 0 of the output of the first circuit 1. This detection comprises, for example, the detection of the passage of the supply voltage Vcc thereof (for example, equal to 5V) under a predetermined first threshold value Vthreshold(1). Immediately, this detection, the second circuit can tilt the input thereof to the output and force a putting at a logic level 1 of the output thereof, so as to emit an electrical pulse to the first circuit 1. Consequently, the voltage at the level of the second circuit can be forced at a logic level 0 while it decreases due to the cutting of supply 110. This phenomenon is illustrated in FIG. 3b by the sudden fall in voltage at the level of the second circuit 2, following the detection by the second circuit 2 of the passage of the supply voltage Vcc thereof under a first threshold value Vthreshold(1). The electrical pulse is actually generated by the second circuit 2 using the electrical energy that it also stores. This pulse is therefore potentially of a voltage greater than a predetermined second threshold value Vthreshold(2). The first threshold value Vthreshold(1) is, for example, greater than the second threshold value Vthreshold(2). The second threshold value Vthreshold(2) is configured such that the voltage of the pulse generated by the second circuit 2 can be greater there and such that any exceeding of voltage above the second threshold value Vthreshold(2) can be detected at the input of the first circuit 1.

This clearing functionality can require the addition of a diode and of a pull-up resistor R in the manner schematically illustrated in FIG. 5. It is noted that the pull-up resistor is "pull-down" mounted there.

The series transmission method can thus make it possible to clear at least one pulse, even each pulse, transmitted. Each clearing is configured to succeed directly to a corresponding cutting of supply 110.

The duration of the pulses depends on the start-up time of the second circuit 2 after an increase in supply, and of the technology used for the non-volatile memory support 21.

For example, a flash memory with a start-up duration of around 1 ms (milliseconds) and is capable of storing the value of a bit in less than 1 ms. The following can be had:
t3=2 ms;
t2=3 ms;
t1=4 ms; and
t6≥5 ms,
where t3 is the duration of an initial data pulse 102, t2 is the duration of a data pulse 101 of bit equal to 1, t1 is the duration of a data pulse 101 of bit equal to 0, and t6 is the duration of a final data pulse 103 and/or processing pulse 105.

With an EEPROM technology, the time for writing the value of a bit is around 5 ms. The following can be had:
t3=6 ms;
t2=11 ms;
t1=16 ms; and
t6≥21 ms,
where, as before, t3 is the duration of an initial data pulse 102, t2 is the duration of a data pulse 101 of bit equal to 1, t1 is the duration of a data pulse 101 of bit equal to 0, and t6 is the duration of a final data pulse 103 and/or of processing pulse 105.

The duration of the processing pulse 105 is according to the application considered. For example, the duration of the processing pulse 105 will be of a few seconds to be able to process the updating of an e-paper type display device. The processing can start from the detection of a pulse of duration greater than the duration of a final data pulse 103.

These durations are given for information purposes, and can vary according to the technology used and the desired optimisations.

The protocol for verifying the validity of the command transmitted and stored on the non-volatile memory support 21 of the second circuit 2 is illustrated below.

Once the bytes reconstituted from bits, a protocol making it possible to verify the validity of the frame is used. For example, a frame can be written:
<Byte indicating the length of the frame (LG)>
<Byte 1>
<Byte2>
. . . .
<Byte LG>
<CRC>

Upon the detection of the processing pulse 105, the frame is verified from the data stored on the non-volatile memory support 21 of the second circuit 2; and, if the frame is valid, the corresponding command is executed.

The invention is not limited to the embodiments described above and extends to all the embodiments covered by the claims.

For example, each pulse can be configured so as to have at least one from among an amplitude of the electrical supply current and a frequency of an electrical supply signal, specific to supplying the second circuit and to corresponding to an item of data transmitted. It can therefore be considered that each item of data transmitted no longer corresponds to a pulse, but to an amplitude and/or a frequency. It can therefore be considered that each item of data transmitted no longer corresponds only to a pulse duration, but also to an amplitude and/or a frequency.

When the frequency of the pulse is used, the first circuit 1 generates an alternating current that it transmits to the second circuit 2 for electrical supply purposes and for purposes of transmitting series of data. The first circuit 1 can consequently be configured. For example, it can be necessary that the first circuit 1 or the second circuit 2 integrates a diode bridge and a filtering capacity.

It must be noted that the clearing protocol described above is not adapted to an alternating current supply.

Another variant of the series transmission method by the supply, consists of generating pulses at 0 (the supplied state being with the supply at 1) sufficiently short such that the supplying of the second circuit 2 does not completely come down. The second circuit 2 thus advantageously comprises a filtering capacity at the level of the supply thereof.

The invention claimed is:

1. A method for transmitting series of data comprising a transmission, from a first electronic circuit to at least one second electronic circuit via an electrical connection line between the first circuit and the second circuit, and in reference to a ground line common to the first circuits and the second circuit, of at least one series of pulses called data pulses, each data pulse configured both to electrically supply the second circuit and to transmit an item of data from a series of data, interpretable by the second circuit,
the method comprising:
cutting the supply of the second circuit by the first circuit between two successive data pulses, and
for each data pulse and before the second circuit is switched off, because of failure in supply, storing, on a non-volatile memory support of the second circuit, the item of data transmitted by this data pulse.

2. The method according to claim 1, wherein the cutting of the supply is configured such that the second circuit is switched off, because of failure in supply.

3. The method according to claim 1, wherein each data pulse is configured such that the item of data transmitted depends on a duration of this pulse.

4. The method according to claim 1, wherein at least one data pulse of each series is configured to transmit one from among an item of bit data equal to 0 and an item of bit data equal to 1.

5. The method according to claim 1, wherein each series of data pulses comprises a predetermined number of data pulses.

6. The method according to claim 1, wherein each series of data pulses comprises at least one from among an initial data pulse configured to transmit an item of series initialisation data and final data pulse configured to transmit an item of series end data, the corresponding one from among the item of initialisation data and the item of series end data corresponding to a predetermined succession of bits.

7. The method according to claim 1, wherein the series of data pulses, or a succession of series, comprises, at least one data pulse called control pulse configured to transmit a control value of a quantity of data intended to be transmitted by the same series of data pulses, or by said succession of series.

8. The method according to claim 1, wherein the storage of data transmitted by the data pulses of one series, or a succession of series, is configured so as to form a set of bits, even a set of bytes, coding a command which can be interpreted and executed by an integrated circuit of the second circuit.

9. The method according to claim 8, comprising a transmission from the first circuit to the second circuit, via the electrical connection line and in reference to the ground line, of a pulse called processing pulse, configured to transmit an order of processing said command,
the method comprising, for each processing pulse (105) and before this ends, interpreting and executing the command.

10. The method according to claim 9, wherein the processing pulse is configured to follow directly a data pulse such that said pulses form one single and same data and processing pulse configured, before it ends, to store the item of data transmitted and interpreting and executing the command, without the second circuit being switched off, because of failure in supply.

11. The method according to claim 9, wherein the interpretation and execution of the command comprises beforehand, a verification of validity of the command.

12. The method according to claim 1, further comprising: clearing at least one data pulse, of the data pulses, each clearing being configured to follow directly a corresponding cutting of supply.

13. The method according to claim 9, wherein the interpretation and execution of the command comprises an updating of a display device, connected to the integrated circuit of the second circuit.

14. The method according to claim 13, comprising a repetition of the method for obtaining that the interpretation and execution of the command comprise a new updating of the display device.

15. A system for transmitting series of data comprising:
a first electronic circuit, and
at least one second electronic circuit, the first circuit and each second circuit being connected together via an electrical connection line and a ground line common to the first circuits and the second circuit,
the system configured to transmit, from the first circuit, to the second circuit, via the electrical connection line and in reference to the ground line, at least one series of pulses called data pulses, each data pulse configured both to electrically supply the second circuit and to transmit an item of data of a series of data which can be interpreted by the second circuit, and
wherein the first circuit comprises a switch for supplying the second circuit by the first circuit configured to cut the supply between two successive data pulses, and
wherein the second circuit comprises a non-volatile memory support configured to store the item of data transmitted by each data pulse before the second circuit is switched off, because of failure in supply.

* * * * *